(12) United States Patent
Lam et al.

(10) Patent No.: US 8,861,137 B1
(45) Date of Patent: Oct. 14, 2014

(54) PERPENDICULAR MAGNETIC RECORDING WRITE HEAD WITH MAIN POLE FORMED ON A METALLIC AMORPHOUS UNDERLAYER

(71) Applicant: HGST Netherlands B.V., Amsterdam (NL)

(72) Inventors: Hieu Lam, Milpitas, CA (US); Stefan Maat, San Jose, CA (US); Ning Shi, San Jose, CA (US); Alexander M. Zeltser, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/905,291

(22) Filed: May 30, 2013

(51) Int. Cl.
*G11B 5/23* (2006.01)
*B44C 1/22* (2006.01)
*G11B 5/21* (2006.01)

(52) U.S. Cl.
CPC .................................... *G11B 5/21* (2013.01)
USPC .......................................... 360/125.3; 216/22

(58) Field of Classification Search
CPC ..................................... G11B 5/23; B44C 1/22
USPC ............... 360/125.03, 125.12, 125.16, 125.3; 216/22, 66, 74, 89, 96
See application file for complete search history.

(56) References Cited

U.S. PATENT DOCUMENTS

| | | | |
|---|---|---|---|
| 6,791,796 B2 | 9/2004 | Shukh et al. | |
| 7,233,458 B2 | 6/2007 | Brusca | |
| 7,672,080 B1 | 3/2010 | Tang | |
| 7,777,989 B2 | 8/2010 | Sun | |
| 8,015,692 B1 | 9/2011 | Zhang | |
| 8,262,918 B1 * | 9/2012 | Li et al. | 216/22 |
| 8,345,383 B2 * | 1/2013 | Yan et al. | 360/125.03 |
| 8,576,517 B1 * | 11/2013 | Tran et al. | 360/319 |
| 8,670,213 B1 * | 3/2014 | Zeng et al. | 360/125.3 |
| 8,711,518 B1 * | 4/2014 | Zeng et al. | 360/125.03 |
| 2012/0164486 A1 | 6/2012 | Bonhote' | |
| 2012/0164487 A1 | 6/2012 | Childress | |

* cited by examiner

*Primary Examiner* — Angel Castro
(74) *Attorney, Agent, or Firm* — Thomas R. Berthold (57) ABSTRACT

A perpendicular magnetic recording write head has a main pole that is typically CoFe electroplated into a generally trapezoidal shaped alumina trench. A metallic side gap layer is deposited into the alumina trench to adjust the trench width to the desired main pole dimension. A nonmagnetic metallic amorphous underlayer, preferably an amorphous NiTa alloy or an amorphous NiNb alloy, is then deposited on the side gap layer. A pole seed layer, such as a NiCr/CoFe bilayer, is deposited into the trench onto the metallic amorphous underlayer prior to electroplating the CoFe main pole. The metallic amorphous underlayer serves to reset the growth between the side gap layer and the NiCr/CoFe pole seed layer. The metallic amorphous underlayer does not insulate the electroplating CoFe layer from the metallic side gap layer, which allows for better current conduction normal to the layers, resulting in a main pole with improved magnetic properties.

12 Claims, 8 Drawing Sheets

PERPENDICULAR MAGNETIC RECORDING WRITE HEAD WITH MAIN POLE FORMED ON A METALLIC AMORPHOUS UNDERLAYER

BACKGROUND OF THE INVENTION

1. Field of the Invention

This invention relates generally to perpendicular magnetic recording systems, and more particularly to perpendicular magnetic recording write heads for use in magnetic recording disk drives.

2. Description of the Related Art

In a perpendicular magnetic recording system like a magnetic recording hard disk drive, the recorded bits are stored in a perpendicular or out-of-plane orientation in the recording layer. The recording or write head in perpendicular magnetic recording disk drives includes a write pole comprising a shaped pole and a main pole for writing to the recording layer, and one or more return poles for return of magnetic flux from the recording layer.

The main pole is typically formed by electroplating a high moment magnetic material, the most common example being cobalt-iron (CoFe) alloys. To form the main pole, in one technique referred to as the Damascene process, a generally trapezoidal shaped trench with sloped sidewalls is formed in a substrate. A metallic material like Ru is deposited in the trench to serve as a side gap layer for the main pole. The main pole may be electroplated onto a pole seed layer, such as a NiCr/CoFe bilayer, which is known to produce the soft magnetic property (low coercivity) desirable for the subsequently electroplated CoFe main pole. The NiCr/CoFe pole seed layer may be grown on top of an amorphous underlayer to break the effect of the crystalline orientation of the underlying Ru side gap layer on the CoFe main pole. In the prior art, a metal oxide material like alumina ($Al_2O_3$) is typically used as the amorphous underlayer prior to deposition of the NiCr/CoFe pole seed layer. Because the metallic side gap layer, for example Ru, is formed first before the NiCr/CoFe pole seed layer and electroplated CoFe main pole, it also serves as an electroplating seed for conduction of the electroplating current. However, while a metal oxide underlayer like alumina provides excellent growth for the NiCr/CoFe pole seed layer, it insulates the electroplating structure from the underlying Ru side gap layer. As a result, the current-carrying capacity originates solely from the NiCr/CoFe pole seed layer and is drastically reduced due to alumina insulation of the Ru side gap layer.

What is needed is a perpendicular magnetic recording write head with a main pole formed on an amorphous underlayer that produces low coercivity in the main pole and does not insulate the electroplating structure.

SUMMARY OF THE INVENTION

Embodiments of the invention relate to a perpendicular magnetic recording write head for use in magnetic recording disk drives. The write head has a main pole that is typically CoFe electroplated into a generally trapezoidal shaped alumina ($Al_2O_3$) trench. A metallic side gap layer is deposited into the alumina trench to adjust the trench width to the desired main pole dimension. A nonmagnetic metallic amorphous underlayer is then deposited on the side gap layer. A pole seed layer, such as a NiCr/CoFe bilayer, is deposited into the trench onto the metallic amorphous underlayer prior to electroplating the CoFe main pole. The NiCr/CoFe bilayer is known to promote soft magnetic properties desirable for the subsequently electroplated CoFe main pole. The metallic amorphous underlayer serves to reset the growth between the side gap layer and the NiCr/CoFe pole seed layer. The metallic amorphous underlayer for the pole seed layer is preferably an amorphous NiTa alloy or an amorphous NiNb alloy. The metallic amorphous underlayer, unlike metal oxides such as alumina that were used in the prior art, does not insulate the electroplating CoFe layer from the metallic side gap layer. This allows better current conduction normal to the layers, resulting in a main pole with improved magnetic properties.

For a fuller understanding of the nature and advantages of the present invention, reference should be made to the following detailed description taken together with the accompanying figures.

DETAILED DESCRIPTION OF THE INVENTION

Figure 1:
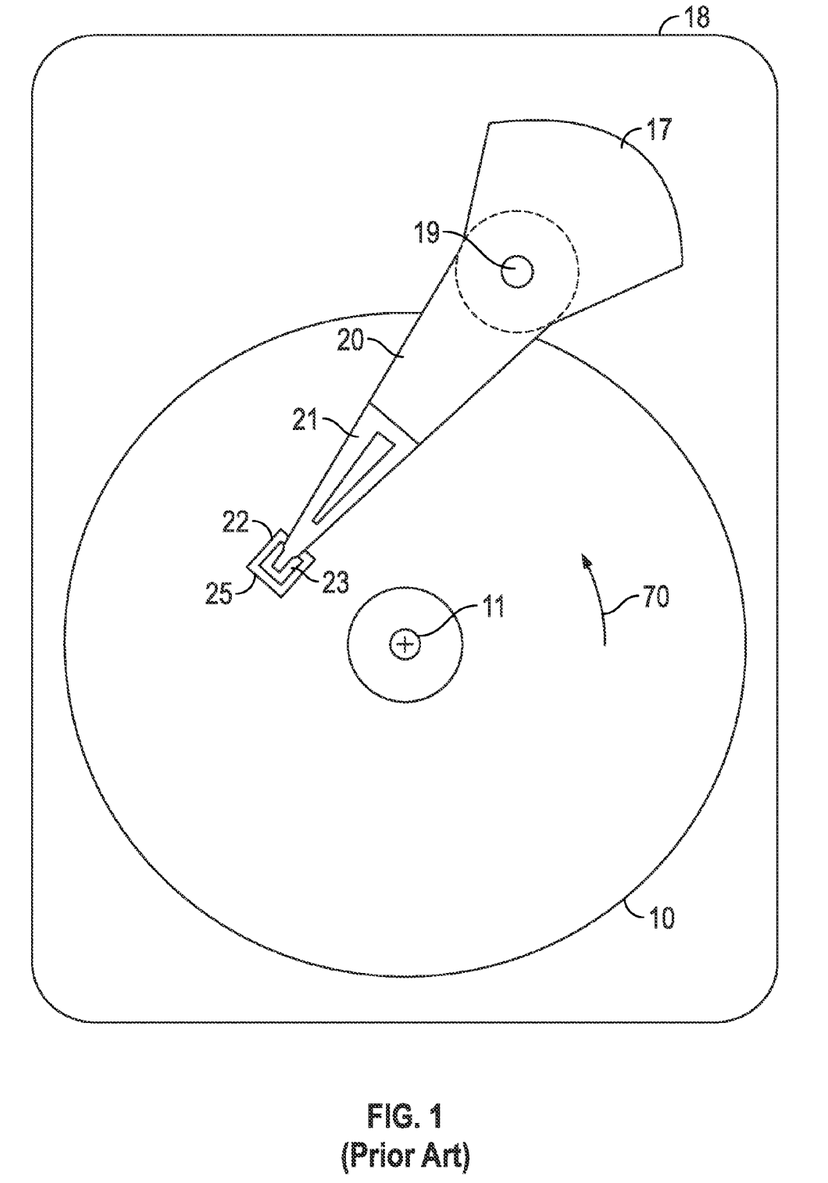
FIG. 1 is a schematic top view of a conventional magnetic recording hard disk drive with the cover removed.

FIG. 1 is a block diagram of a conventional magnetic recording hard disk drive with the cover removed. The disk drive includes a magnetic recording disk 10 and a rotary voice coil motor (VCM) actuator 17 supported on a disk drive housing or base 18. The disk 10 has a magnetic recording layer (RL) with generally concentric data tracks. The disk 10 has a center of rotation 11 and is rotated in direction 70 by a spindle motor (not shown) mounted to base 18. The actuator 17 pivots about axis 19 and includes a rigid actuator arm 20. A generally flexible suspension 21 includes a flexure element 23 and is attached to the end of arm 20. A head carrier or air-bearing slider 22 is attached to the flexure 23. A magnetic recording read/write head (not shown) is formed on the trailing surface 25 of slider 22. The flexure 23 and suspension 20 enable the slider to "pitch" and "roll" on an air-bearing generated by the rotating disk 10. Typically, there are multiple disks stacked on a hub that is rotated by the spindle motor, with a separate slider and read/write head associated with each disk surface.

Figure 2A:
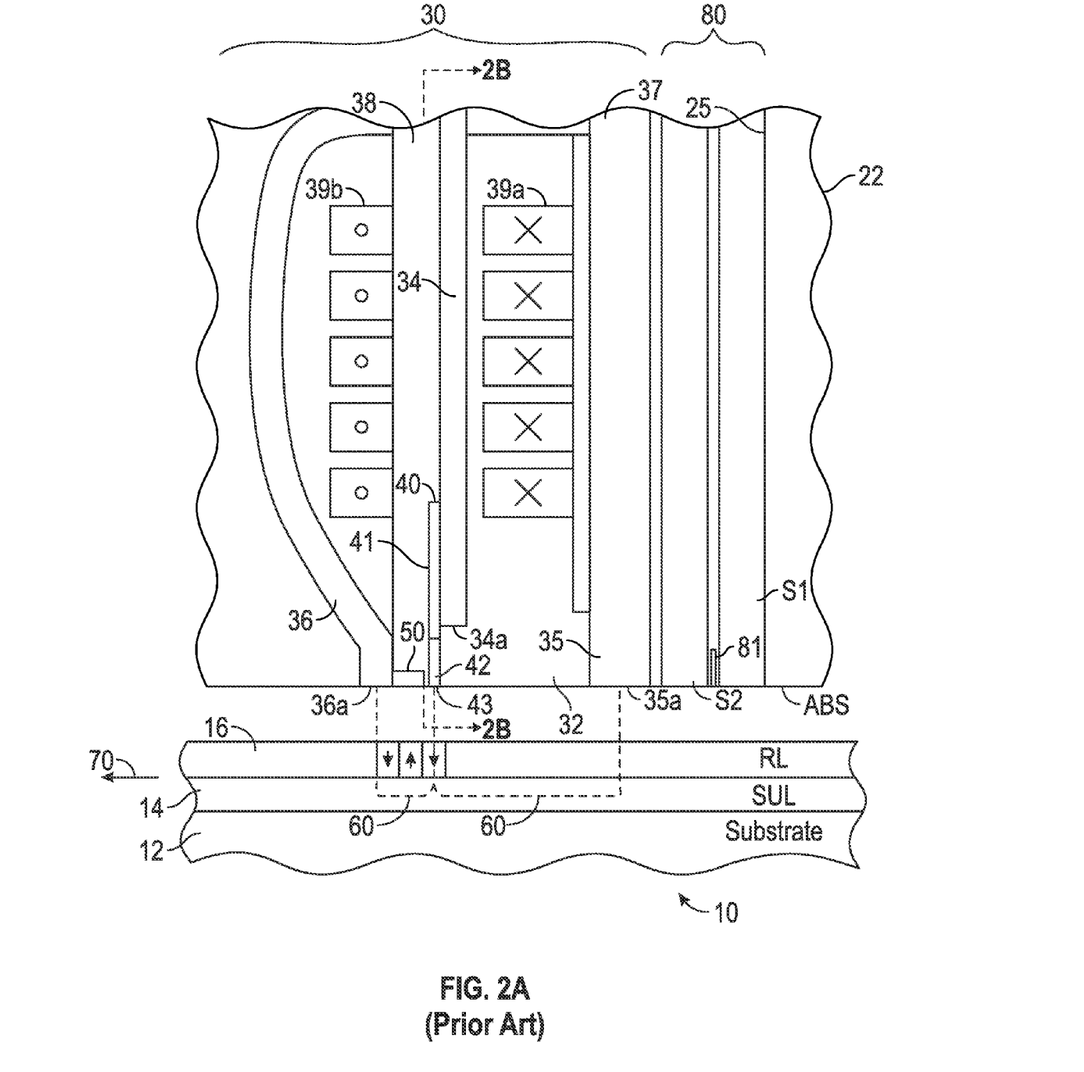
FIG. 2A is a side sectional view of a conventional perpendicular magnetic recording system showing a read head, a write head, and a recording medium taken through a plane parallel to a data track.

FIG. 2A is a side sectional view of a portion of the slider 22 showing a read head 80, a write head 30, and the recording medium (disk 10) with RL 16 taken through a plane parallel to a data track. As shown in FIG. 2A, a "dual-layer" medium 10 includes a perpendicular magnetic data recording layer (RL) 16 on a "soft" or relatively low-coercivity magnetically permeable underlayer (SUL) 14 formed on the disk substrate 12. This type of medium is shown with a magnetoresistive (MR) read head 80 and a single pole type of recording or write head 30 that are shown in a section taken through a plane parallel with a data track on RL 16. The MR read head 80 includes the MR sensor 81 located between MR shields S1, S2.

The write head 30 includes a yoke made up of the shaped pole 34, also referred to as P2, a first flux return pole 35, also referred to as P1, a yoke stud 37 connecting the shaped pole 34 and first return pole 35, a second flux return pole 36, also referred to as P3, a yoke stud 38 connecting the shaped pole 34 and second flux return pole 36, and a thin film coil 39a, 39b shown in section around shaped pole 34. The coil 39a, 39b is depicted as a helical coil wrapped around shaped pole 34, but the coil may also be a well-known "pancake" coil wherein the coil is wrapped around the yoke and the coil segments lie in substantially the same plane. A flared main-pole (MP) 40 is formed over the shaped pole 34 and has a flared portion 41 and a pole tip portion 42 with a pole tip end 43 that faces the outer surface of disk 10. Insulating material 32, typically alumina, separates the coil 39a, 39b from the shaped pole 34 and MP 40. Write current through coil 39a, 39b induces a magnetic field (shown by dashed line 60) from the MP 40 that passes through the RL 16 to write to the RL 16 by magnetizing the region of the RL 16 beneath the MP 40. The magnetic field 60 is directed from the RL 16 through the flux return path provided by the SUL 14, and back to the flux return poles 35, 36. The read head 80 and write head 30 are formed as a series of films deposited on the trailing surface 25 of slider 22. Slider 22 has an air-bearing surface (ABS) that faces the disk 10. The pole tip end 43 is located substantially at the ABS, and the first and second return poles, 35, 36 have ends 35a, 36a, respectively, that are located substantially at the ABS and thus generally coplanar with pole tip end 43. The shaped pole 34, on which MP 40 is formed, has an end 34a that is recessed from the ABS. In FIG. 2A the disk 10 moves past the recording head in the direction indicated by arrow 70. The RL 16 is illustrated with perpendicularly recorded or magnetized regions, with adjacent regions having opposite magnetization directions, as represented by the arrows. The magnetic transitions between adjacent oppositely directed magnetized regions are detectable as resistance changes by the MR sensor 81 as the recorded bits. FIG. 2A also illustrates an optional trailing shield (TS) 50 that forms part of a "wraparound" shield that is described in more detail in FIG. 2C.

Figure 2B:
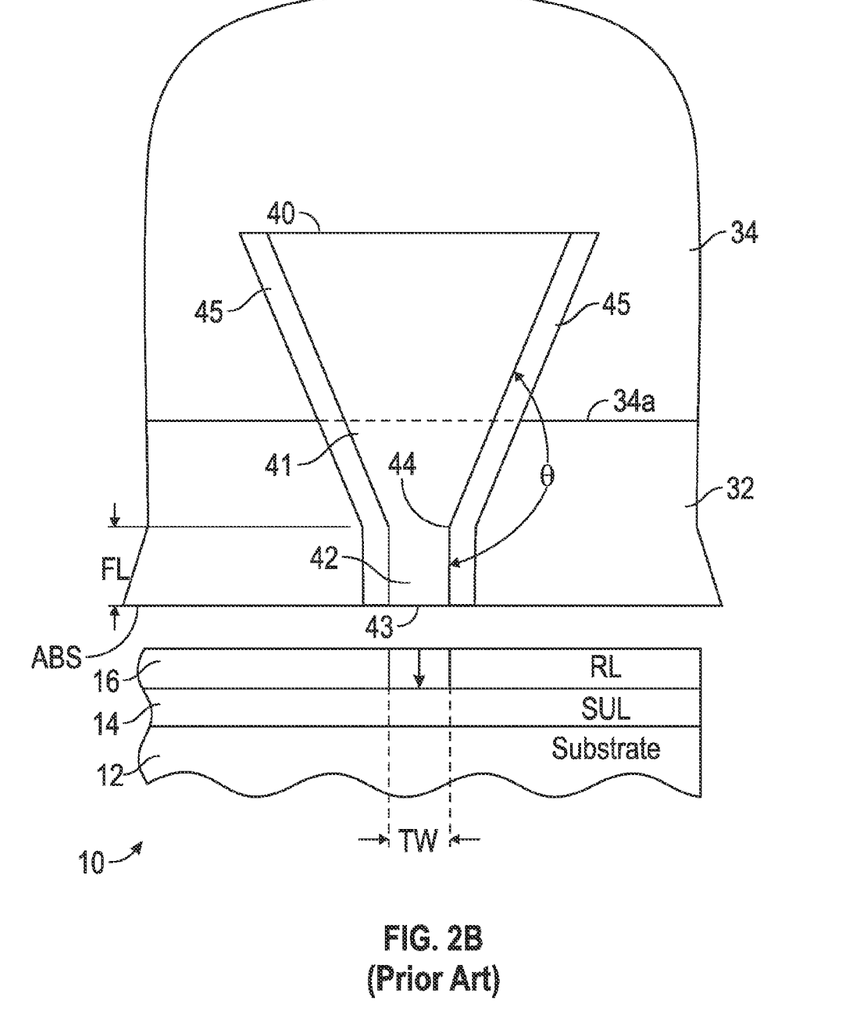
FIG. 2B is a view in the direction 2B-2B of FIG. 2A and illustrates the width of the main pole (MP) to substantially define the trackwidth (TW) of the data recorded in the recording layer (RL).

FIG. 2B is a view in the direction 2B-2B of FIG. 2A. FIG. 2B shows a shaped pole 34 which serves as the substrate for the MP 40. Shaped pole 34 has its end 34a recessed from the ABS, and better illustrates the flare region 41 of flared MP 40. The region between the pole tip portion 42 and the flare portion 41 is called the flare point 44. The flare point 44 of the MP 40 is sometimes referred to as the "choke" point because it is the point where the flux density is highest and where the MP 40 saturates. The MP tip 42 has a "height" from end 43 to flare point 44 called the flare length (FL). As shown in FIG. 2B, the two side walls of MP tip 42 define its width in the cross-track direction, which substantially defines the track-width (TW) of the data recorded in the RL 16. The region of the MP 40 above the flare region 41 is substantially wider than MP tip 42 below the flare region 41 and the flare point 44 is the transition point where the MP 40 begins to widen with distance from the ABS. The angle θ in FIG. 2B is called the flare angle and is between 90 and 180 degrees, typically between about 120 and 150 degrees. The MP 40 includes nonmagnetic side gap layers 45.

Figure 2C:
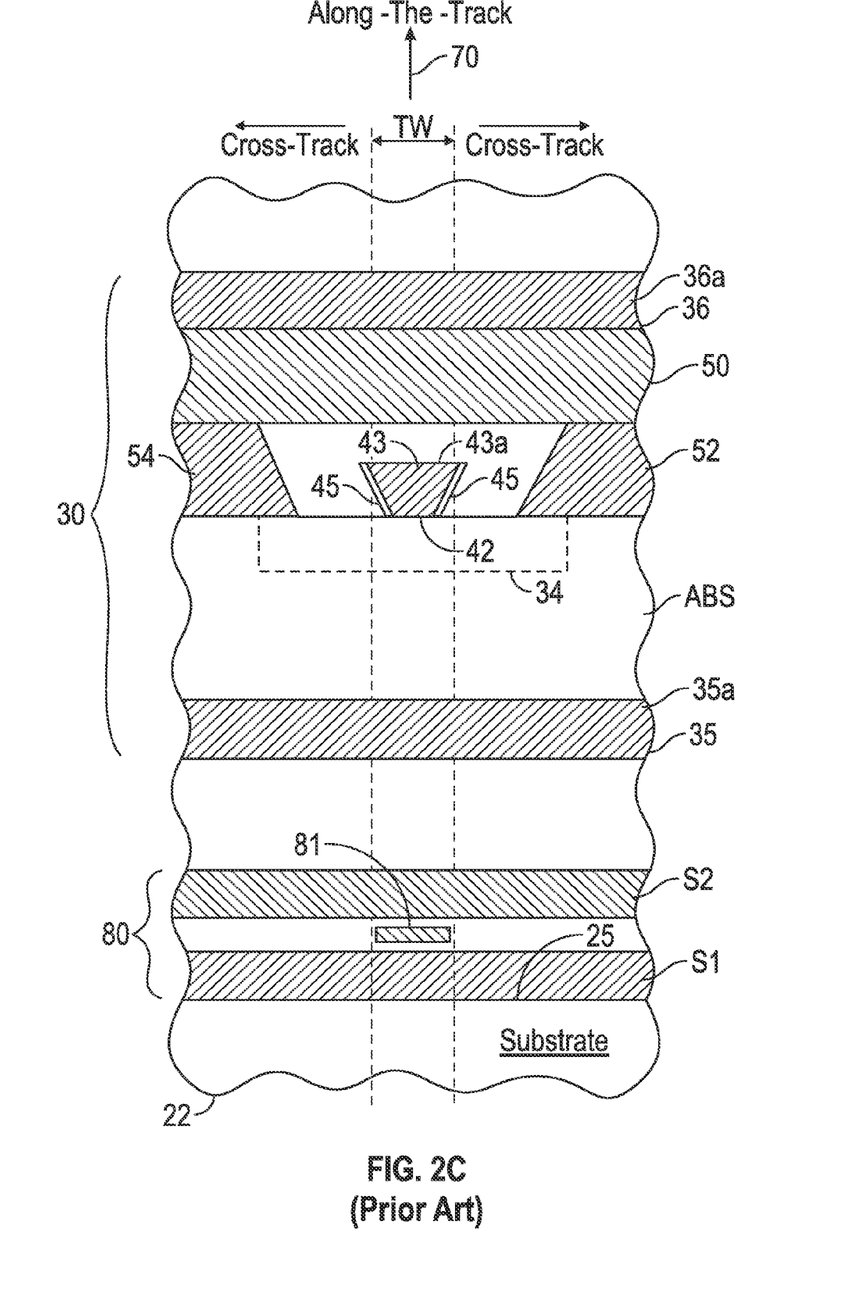
FIG. 2C is a view from the air-bearing surface (ABS) of the prior art write head in FIG. 2A and shows a wraparound shield substantially surrounding the MP tip and connected to the return pole.

FIG. 2C illustrates the write head 30 as seen from the disk 10. The ABS is the recording-layer-facing surface of the slider 22 that faces the medium 10 and is shown in FIG. 2C without the thin protective overcoat typically present in an actual slider. The recording-layer-facing surface shall mean the surface of the slider or head carrier that is covered with a thin protective overcoat, the actual outer surface of the head carrier if there is no overcoat, or the outer surface of the overcoat. The phrase "substantially at the recording-layer-facing surface" shall mean actually at the surface or slightly recessed from the surface. The disk 10 moves relative to the write head 30 in the direction 70, which is called the along-the-track direction. The dashed lines in FIG. 2C represent the sides of a data track. The width of the MP tip 42 substantially defines the track-width (TW) of the data tracks in the RL 16. The MP tip 42 has a generally trapezoidal shape with a trailing edge 43a as a result of the manufacturing process. The shaped pole 34 is shown with dashed lines because it is recessed from the ABS. The direction perpendicular to direction 70 and parallel to the plane of the ABS is called the cross-track direction.

The wraparound shield that includes side shields 52, 54 and TS 50 is described in detail as a shield for a conventional perpendicular recording head in U.S. Pat. No. 7,002,775 B2, assigned to the same assignee as this application. The shields 50, 52, 54 all have ends substantially at the recording-layer-facing surface. The shields 50, 52, 54 are typically connected to one another and substantially surround the MP tip 42 to from a "wraparound" shield. The TS 50 and side shields 52, 54 are separated from MP tip 42 by nonmagnetic gap material, typically alumina. The wraparound shield with shields 50, 52, 54 separated from the MP tip 42 by nonmagnetic gap material alters the angle of the write field and improves the write field gradient at the point of writing, and also shields the RL from the writing field at regions away from the track being written. The wraparound shield is shown as being connected to the return pole 36 but it may also be a "floating" shield, meaning that it is not connected to either the return pole 36 or other portions of the yoke by flux-conducting material. In other variations of the write head 30, instead of a wraparound shield only a TS without side shields may be used. The TS may be either "floating" or connected to return pole 36. The yoke and shields of write head 30 are formed of soft ferromagnetic material, such as alloys of NiFe, CoFe and NiFeCo that are typically formed by electroplating. The shaped pole 34 and MP 40 are formed of a high-moment material, such as a high-moment CoFe alloy with Fe present between 60 and 80 wt. %. The CoFe alloy may comprise just Co and Fe or may contain one or more other elements, such as Ni, Al, Ta, Hf, B, N and C.

FIG. 2C also illustrates the magnetoresistive (MR) read head 80 that includes the MR sensor 81 located between MR shields S1, S2. The films making up MR head 80 and write head 30 as shown in FIG. 2C are formed in succession on a substrate by a series of thin film deposition, etching and lithographic patterning process steps.

The MP 40 is typically electroplated into a generally trapezoidal shaped alumina ($Al_2O_3$) trench that has been formed on the surface of the shaped pole 34 and alumina 32. A metallic side gap layer 45, which is typically formed of Ru, is deposited into the alumina trench to adjust the trench width to the desired MP dimension. A pole seed layer, such as a NiCr/CoFe bilayer, may be deposited into the trench prior to plating the MP. The NiCr/CoFe bilayer is known to promote soft magnetic properties desirable for the subsequently electroplated CoFe alloy pole layer. To further improve the soft magnetic properties of the NiCr/CoFe bilayer it can be grown on top of an amorphous underlayer. The amorphous underlayer serves to reset the growth between the Ru side gap layer and the NiCr/CoFe pole seed layer. In the prior art, a metal-oxide like alumina has been used as the amorphous underlayer. Typically the metallic Ru side gap layer 45 serves as an electroplating seed layer. Due to its thickness and relatively low resistivity it can carry a significant amount of the electroplating current. However, when an oxide underlayer like alumina is deposited on top of the metallic Ru side gap layer and under the metallic NiCr/CoFe pole seed layer, it electrically insulates the pole seed layer from the underlying metallic Ru side gap layer. Due to its thickness and relatively high resistivity the current-carrying capacity of the NiCr/CoFe pole seed layer is limited. The NiCr/CoFe pole seed layer cannot be made thick enough for electroplating current conduction purposes.

In an embodiment of this invention the amorphous underlayer for the pole seed layer is a nonmagnetic metallic amorphous underlayer, preferably an amorphous NiTa alloy or an amorphous NiNb alloy. The preferred compositions are the eutectic compositions, $NiTa_{37.5}$ and $NiNb_{40}$, where the subscripts are in atomic percent. These compositions are known to be amorphous. However NiTa may have the composition $Ni_{(100-x)}Ta_x$ where x is in atomic percent and is greater than or equal to 30 and less than or equal to 50, and NiNb may have the composition $Ni_{(100-x)}Nb_x$ where x is in atomic percent and is greater than or equal to 30 and less than or equal to 50. While NiNb and NiTa are the preferred materials as nonmagnetic amorphous metallic underlayers, there is a class of well-known "bulk" amorphous metallic alloys that may also function as the underlayer. Also, nonmagnetic Ni-based amorphous alloys may function as the underlayer.

The electrical resistivities Σ of amorphous NiTa and NiNb alloys estimated from 100 Å thick films deposited on thermally oxidized Si wafers, are, in the case of the tested examples, 181 μΩ-cm and 162 μΩ-cm, respectively. These values are film thickness-dependent, and are relatively high compared to 20 μΩ-cm typical for Ru of similar thickness range. Thus most of the parallel electroplating current will be carried by the thicker Ru side gap layer since it is connected in parallel with the metallic amorphous underlayer. For out-of-plane current delivery to promote the electrochemical reaction required for electroplating, the conduction length (L) will be only a few nanometers (the NiTa or NiNb film thickness), while the cross sectional area (A) is very large. For the resistance, $R=\rho*L/A$, the one order increase in ρ will be more than offset by the decrease in L and increase in A. Thus the amorphous NiTa and NiNb underlayers enable the side gap layer to serve as an electroplating seed.

Figure 3A:
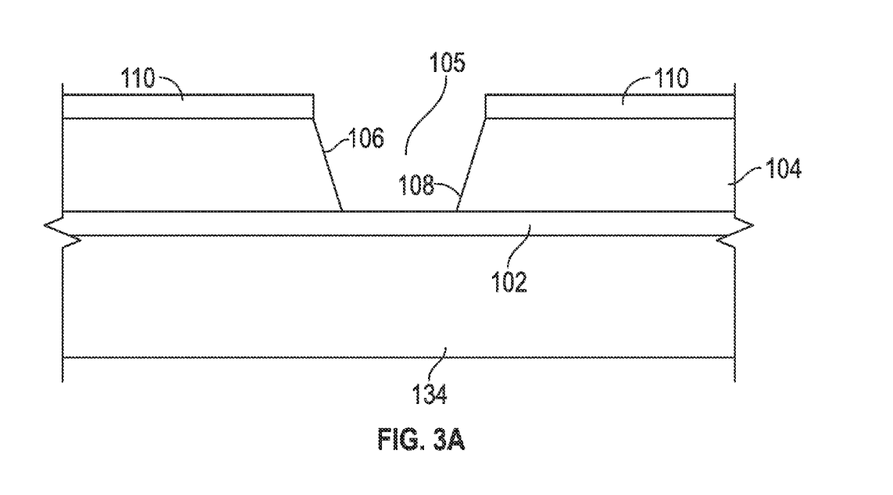
FIGS. 3A-3C illustrate the method of making the MP with metallic amorphous underlayers according to the invention.
Figure 3B:
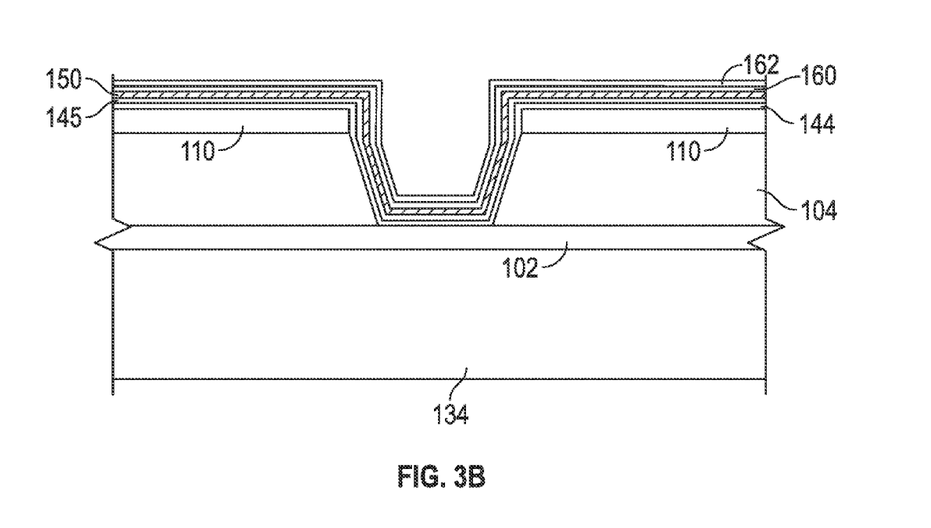
Figure 3C:
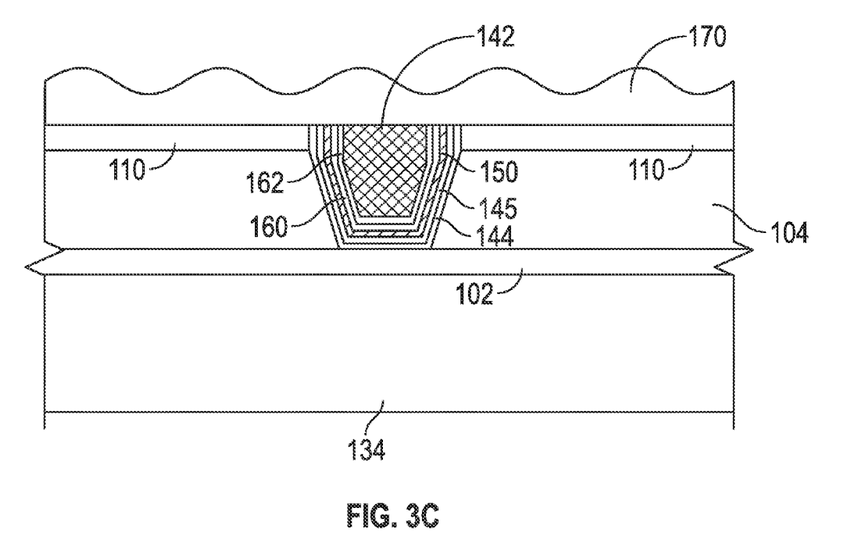

FIGS. 3A-3C illustrate the method of making the MP according to the invention. FIG. 3A illustrates a substrate, which is shown as a portion of a shaped pole 134, with a reactive ion etching (RIE) stop layer 102, for example NiFe, Cr, or NiCr with a thickness between 10-100 nm, and a fill layer 104, for example alumina, on the RIE stop layer 102. Photoresist is patterned on fill layer 104 above the region where the generally trapezoidal shaped trench 105 is to be formed. Subsequently, a hard mask layer 110, for example NiCr and Ta with a thickness between about 10-100 nm, is deposited on the fill layer 104 and over the patterned photoresist. The resist and hard mask material above it are lifted off, followed by a RIE step to form the trench 105 with sloped side walls 106, 108 down to the RIE stop layer 102, using the hardmask layer 110 as an etch mask.

In FIG. 3B, the layers forming the complete seed stack for the subsequently electroplated MP have been sequentially deposited. These include a first seed layer 144 for the side gap layer, the side gap layer 145, the metallic amorphous NiTa or NiNb underlayer 150, the NiCr layer 160 and CoFe layer 162 that make up the NiCr/CoFe MP seed layer. Although NiCr was used in conjunction with CoFe for demonstrating the effectiveness of the metallic amorphous underlayers according to the invention, materials other than NiCr that are suitable include NiFe, Rh, Ta and Au. The side gap layer 145 may be Ru with a thickness between 10-100 nm and is preferably deposited by atomic layer deposition-like chemical vapor deposition (ALCVD). If the side gap layer 145 is Ru, then the first seed layer 144 for the ALCVD Ru gap layer 145 is preferably a Ru layer with a thickness between 1-20 nm deposited, for example, by ion beam deposition (IBD). The amorphous NiTa or NiNb underlayer 150 is deposited, preferably by sputtering, to a thickness between 1-10 nm.

In FIG. 3C the CoFe material for the MP 142 has been electroplated over the structure of FIG. 3B and then subjected to chemical-mechanical-polishing (CMP) down to the hard mask layer 110. The material for the MP 142 may be a CoFe alloy Alternatively the CMP can be performed down to the fill layer 104. An additional insulating fill material 170 is then deposited over the MP 142.

Figure 4A:
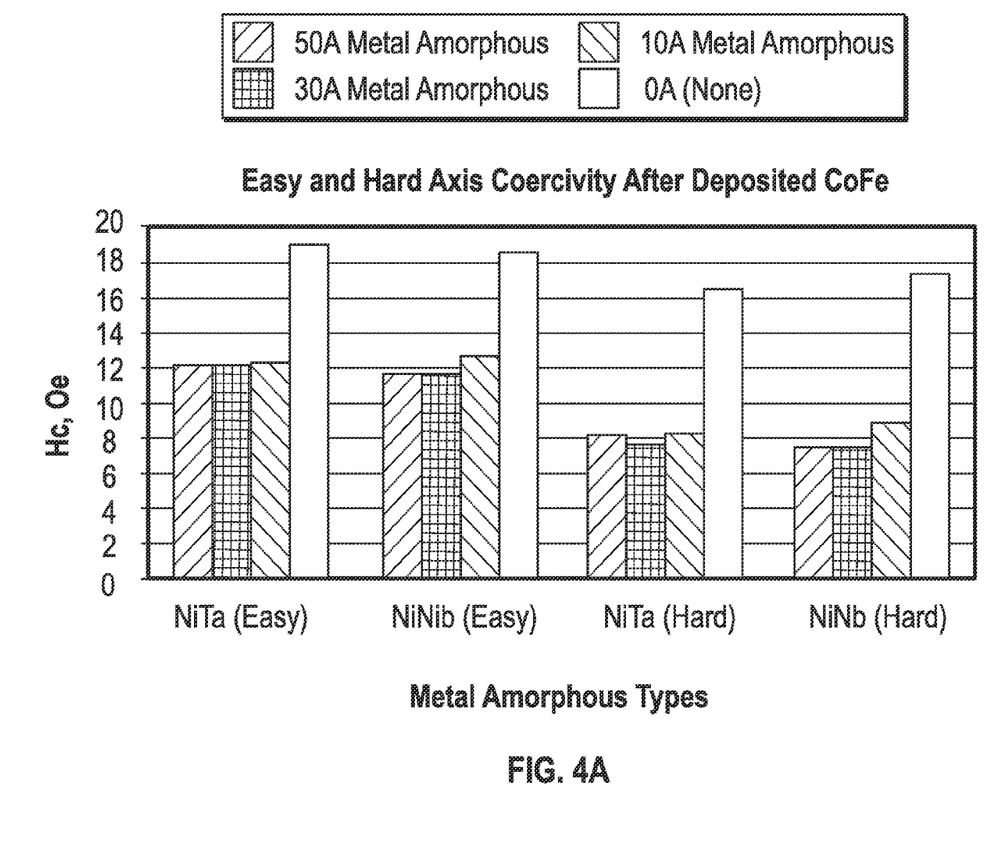
FIG. 4A is a bar chart showing the easy axis coercivity ($H_c$) and hard axis coercivity of the deposited $CoFe_{70}$ layer with NiTa and NiNb amorphous underlayers of different thicknesses.
Figure 4B:
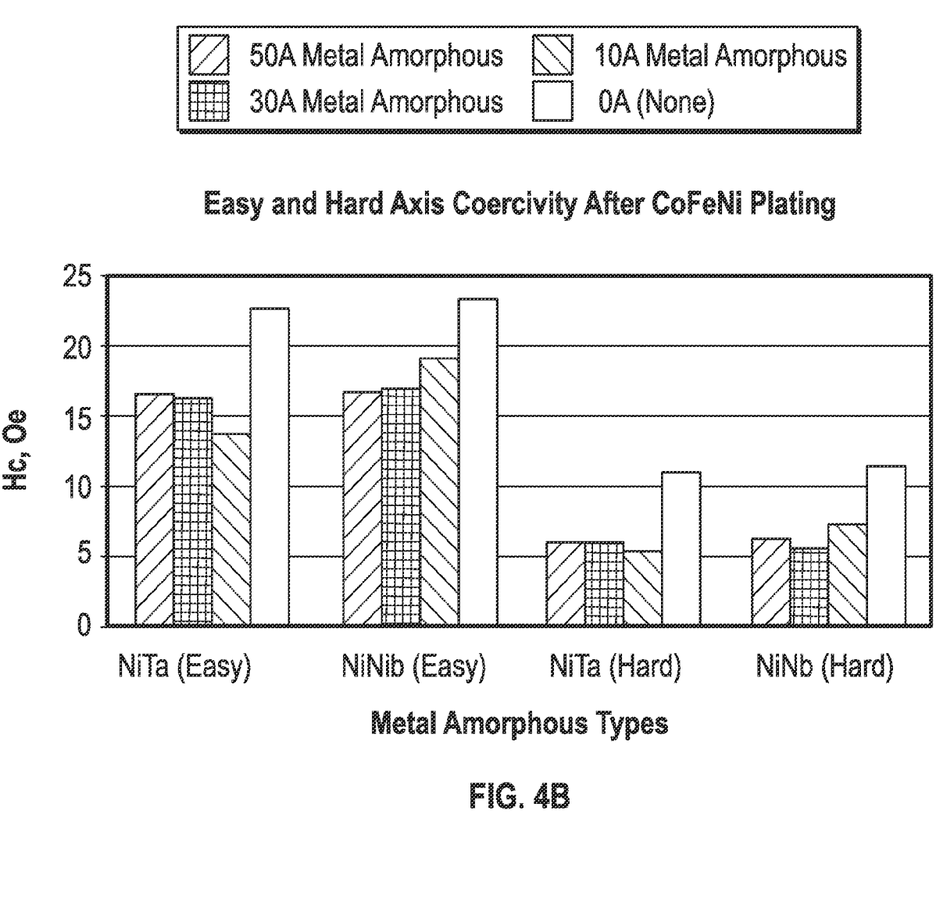
FIG. 4B is a bar chart showing the easy axis coercivity and hard axis coercivity of a CoFeNi electroplated layer on the samples whose data is shown in the bar chart of FIG. 4A.

To demonstrate the effectiveness of the nonmagnetic metallic NiTa and NiNb amorphous underlayers in breaking the effect of the crystalline orientation of the Ru side gap layer on the CoFe portion of the pole seed bilayer, film stacks were made consisting of a 70 Å Ru seed layer, a 400 Å CVD Ru side gap layer, and various thicknesses of NiTa and NiNb amorphous underlayers. Pole seed bilayers of 50 Å $Ni_{50}Cr_{20}$/100 Å $Co_{30}Fe_{70}$ were then sputter deposited onto the sample stacks. FIG. 4A is a bar chart showing the easy axis coercivity ($H_c$) and hard axis coercivity of the sputter deposited $Co_{30}Fe_{70}$ layer. The easy and hard axis coercivities of the NiCr/$Co_{30}Fe_{70}$ on the NiTa and NiNb amorphous underlayers show a marked improvement over the coercivities of NiCr/$Co_{30}Fe_{70}$ formed directly on the Ru crystalline surface (no metallic amorphous underlayer). FIG. 4B is a bar chart showing that if these samples are then electroplated with 40 nm CoFeNi (with 4 wt % Ni) or similar high moment CoFe alloys, the softening effect of the metallic amorphous underlayer is translated into the electroplated layer as well. Thus with metallic amorphous underlayers according to the invention, a clear beneficial effect in reducing CoFe coercivity is observed on both the sputter deposited CoFe portion of the pole seed bilayer and the CoFe alloy electroplated layer.

To compare the effect of the metallic amorphous underlayers with the prior art alumina underlayers, 30 Å NiCr/500 Å CoFe bilayers were deposited on underlayers of 50 Å NiTa and underlayers of 50 Å NiNb, and the effect of alumina ($Al_2O_3$) was simulated by using thermally oxidized Si wafers. The metallic amorphous underlayers promoted the soft (low coercivity) CoFe growth just as well as $SiO_2$.

In addition to promoting low coercivity of the CoFe alloy MP, the metallic NiTa and NiNb amorphous underlayers, unlike metal oxides such as alumina, do not insulate the electroplating CoFe alloy layer from the metallic Ru side gap layer. This allows better current conduction normal to the layers, resulting in a MP with improved magnetic properties.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording write head for magnetizing regions of a magnetic recording layer comprising:
   a substrate having a trench with sloped sidewalls; and
   a main pole in the substrate trench and having an end for facing the recording layer, the main pole comprising:
   a nonmagnetic gap layer in the trench and on said sidewalls;
   a nonmagnetic metallic amorphous underlayer on the gap layer;
   a pole seed layer comprising Co and Fe on the amorphous underlayer; and
   an electroplated ferromagnetic pole layer comprising Co and Fe on the pole seed layer.

2. The write head of claim 1 wherein the metallic amorphous underlayer is selected from a NiTa alloy and a NiNb alloy.

3. The write head of claim 2 wherein the amorphous underlayer consists of $Ni_{(100-x)}Ta_x$ where x is in atomic percent and is greater than or equal to 30 and less than or equal to 50.

4. The write head of claim 2 wherein the amorphous underlayer consists of $Ni_{(100-x)}Nb_x$ where x is in atomic percent and is greater than or equal to 30 and less than or equal to 50.

5. The write head of claim 1 wherein the gap layer comprises Ru.

6. The write head of claim 1 wherein the gap layer has a thickness greater than or equal to 10 nm and less than or equal to 100 nm.

7. The write head of claim 1 wherein the pole seed layer is a bilayer comprising a lower layer selected from a NiCr alloy, a NiFe alloy, Rh and Au and an upper layer comprising Co and Fe.

8. The write head of claim 1 further comprising an electrically conductive coil for generating magnetic flux in the main pole.

9. A magnetic recording disk drive comprising:
   a rotatable magnetic recording disk comprising a substrate, an underlayer on the substrate, and a perpendicular recording layer on the underlayer; and
   the write head of claim 1.

10. A perpendicular magnetic recording write head comprising:
    a substrate having a generally trapezoidal shaped trench with sloped sidewalls;
    a main pole in the substrate trench and comprising:
    a gap layer comprising Ru in the trench and on said sidewalls;
    an amorphous underlayer on the gap layer and selected from one of $Ni_{(100-x)}Ta_x$, where x is in atomic percent and is greater than or equal to 30 and less than or equal to 50, and $Ni_{(100-x)}Nb_x$, where x is in atomic percent and is greater than or equal to 30 and less than or equal to 50;
    a pole seed bilayer comprising a lower layer on and in contact with the amorphous underlayer and an upper layer comprising Co and Fe on the lower layer; and
    an electroplated ferromagnetic pole layer comprising Co and Fe on the pole seed layer; and
    a shaped ferromagnetic pole in contact with the main pole.

11. The write head of claim 10 wherein the pole seed bilayer lower layer is selected from a NiCr alloy, a NiFe alloy, Rh and Au.

12. The write head of claim 10 further comprising an electrically conductive coil for generating magnetic flux in the main pole.

* * * * *